United States Patent
Vaidya et al.

(10) Patent No.: US 9,756,569 B2
(45) Date of Patent: Sep. 5, 2017

(54) TRANSITIONING FROM MIMO TO SISO TO SAVE POWER

(71) Applicant: BROADCOM CORPORATION, Irvine, CA (US)

(72) Inventors: Harish Vaidya, Bangalore (IN); Rakesh Raman, Bangalore (IN); Manoj Raveendranath Kamath, Bangalore (IN)

(73) Assignee: Avago Technologies General IP (Singapore) PTE. LTD., Singapore (SG)

( * ) Notice: Subject to any disclaimer, the term of this patent is extended or adjusted under 35 U.S.C. 154(b) by 105 days.

(21) Appl. No.: 14/825,111

(22) Filed: Aug. 12, 2015

(65) Prior Publication Data
US 2015/0351036 A1    Dec. 3, 2015

Related U.S. Application Data

(63) Continuation of application No. 13/875,045, filed on May 1, 2013, now Pat. No. 9,144,025, which is a
(Continued)

(51) Int. Cl.
*H04W 52/02* (2009.01)
*H04B 7/0413* (2017.01)
*G06F 1/32* (2006.01)

(52) U.S. Cl.
CPC ...... *H04W 52/0258* (2013.01); *G06F 1/3203* (2013.01); *G06F 1/3278* (2013.01);
(Continued)

(58) Field of Classification Search
CPC ........... H04W 52/0258; H04W 52/028; H04W 52/00; H04W 52/02; H04W 52/0209;
(Continued)

(56) References Cited

U.S. PATENT DOCUMENTS 8,457,029 B2 *  6/2013  Vaidya ............... G06F 1/3203
                                                  370/311
8,780,872 B1 *  7/2014  Ramamurthy ......... H04B 7/024
                                                  370/328
(Continued)

FOREIGN PATENT DOCUMENTS

CN    101106408 A    1/2008
CN    101291478 A    10/2008

OTHER PUBLICATIONS

Part 11: Wireless LAN Medium Access Control (MAC) and Physical Layer (PHY) Specifications Amendment 5: Enhancements of Higher Throughput, IEEE Std 802.11n-2009, (2009), 7 pages.
(Continued)

*Primary Examiner* — Benjamin H Elliott, IV
(74) *Attorney, Agent, or Firm* — McDermott Will & Emery LLP

(57) ABSTRACT

Various example embodiments are disclosed. According to an example embodiment, an apparatus may include at least one processor and at least one memory. The at least one memory may include computer-executable code that, when executed by the processor, is configured to cause the apparatus to send a message to a node in wireless communication with the apparatus, the message indicating a transition by the apparatus from multiple-input multiple-output (MIMO) to single-input single-output (SISO), and transition from wireless MIMO communication with the node to wireless SISO communication with the node after sending the message to the node.

20 Claims, 4 Drawing Sheets

Related U.S. Application Data continuation of application No. 12/942,762, filed on Nov. 9, 2010, now Pat. No. 8,457,029.

(60) Provisional application No. 61/406,319, filed on Oct. 25, 2010.

(52) U.S. Cl.
CPC ........ H04B 7/0413 (2013.01); H04W 52/028 (2013.01); *Y02B 60/126* (2013.01); *Y02B 60/50* (2013.01)

(58) Field of Classification Search
CPC ......... H04W 52/0225; H04W 52/0229; H04W 52/0232; H04W 52/0251; H04B 7/024; H04B 7/0452; H04B 7/0495
See application file for complete search history.

(56) References Cited

U.S. PATENT DOCUMENTS

| | | | |
|---|---|---|---|
| 9,144,025 B2 * | 9/2015 | Vaidya | G06F 1/3203 |
| 2004/0104844 A1 | 6/2004 | Rooyen et al. | |
| 2005/0243780 A1 * | 11/2005 | Trainin | H04L 1/1671 |
| | | | 370/338 |
| 2005/0249227 A1 | 11/2005 | Wang et al. | |
| 2006/0067263 A1 * | 3/2006 | Li | H04B 7/0802 |
| | | | 370/315 |
| 2008/0013504 A1 * | 1/2008 | Nishibayashi | G06F 3/14 |
| | | | 370/338 |
| 2008/0062065 A1 | 3/2008 | Yamamoto et al. | |
| 2009/0040965 A1 | 2/2009 | Matsuo et al. | |
| 2009/0141661 A1 | 6/2009 | Li et al. | |
| 2010/0098184 A1 | 4/2010 | Ryoo et al. | |
| 2010/0195548 A1 | 8/2010 | Navda et al. | |
| 2011/0182215 A1 * | 7/2011 | Gorokhov | H04L 1/1829 |
| | | | 370/280 |
| 2012/0099497 A1 * | 4/2012 | Vaidya | G06F 1/3203 |
| | | | 370/311 |
| 2013/0242836 A1 * | 9/2013 | Vaidya | G06F 1/3203 |
| | | | 370/311 |
| 2015/0351036 A1 * | 12/2015 | Vaidya | G06F 1/3203 |
| | | | 370/311 |

OTHER PUBLICATIONS

Part 11: Wireless LAN Medium Access Control (MAC) and Physical Layer (PHY) Specifications, IEEE Std 802.11, (2007), 18 pages.
WMM Power Save for Mobile and Portable Wi-Fi CERTIFIED Devices, Wi Fi Alliance, (Dec. 2005), 16 pages.

* cited by examiner

1

TRANSITIONING FROM MIMO TO SISO TO SAVE POWER

PRIORITY CLAIM

This application is a continuation of U.S. patent application Ser. No. 13/875,045, entitled "TRANSITIONING FROM MIMO TO SISO TO SAVE POWER," filed May 1, 2013, now U.S. Pat. No. 9,144,025, which is a continuation of U.S. patent application Ser. No. 12/942,762, entitled "TRANSITIONING FROM MIMO TO SISO TO SAVE POWER," filed Nov. 9, 2010, now U.S. Pat. No. 8,457,029, which claims the benefit of U.S. Provisional Patent Application No. 61/406,319, entitled "TRANSITIONING FROM MIMO TO SISO TO SAVE POWER," filed Oct. 25, 2010, all of which are incorporated herein by reference in their entirety.

TECHNICAL FIELD

This description relates to wireless communication devices.

BACKGROUND

Wireless communication devices may be disconnected from external power sources. As such, their available power, typically supplied by a battery, may be limited.

SUMMARY

The details of one or more implementations are set forth in the accompanying drawings and the description below. Other features will be apparent from the description and drawings, and from the claims.

DETAILED DESCRIPTION

Figure 1:
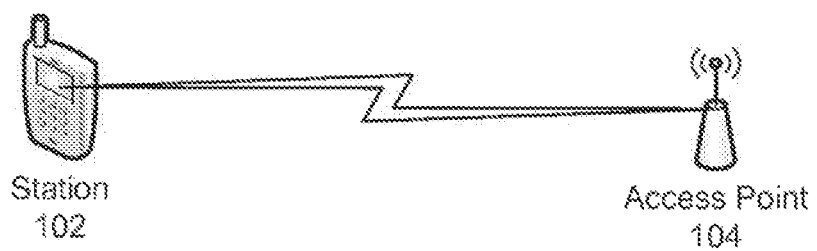
FIG. 1 is a diagram showing two nodes in wireless communication according to an example embodiment.

FIG. 1 is a diagram showing two nodes 102, 104 in wireless (or unguided) communication according to an example embodiment. The nodes 102, 104 may include, for example, IEEE 802.11 wireless local area network (WLAN) nodes (such as a station 102 and an access point 104), IEEE 802.16 Worldwide inter-Operability for Microwave Access (WiMAX) nodes, IEEE 802.15 Bluetooth nodes, or cellular telephones/smartphones and base stations, according to various example embodiments. While the terminology of IEEE 802.11 is used herein, the techniques and methods described herein are applicable to a wide range of wireless (or unguided) communication technologies.

Station 102 may include a station or apparatus in wireless communication with an access point 104. The station 102 may disconnected from any external power source and rely on battery power. The station 102 may have limited battery power, and it may be desirable to reduce the use of the battery power. At times, it may desirable for the station 102 to perform techniques to reduce the use of battery power.

The nodes 102, 104 may be capable of communication using both multiple input, multiple output (MIMO) techniques, in which the transmitting node 102, 104 has two or more transmitters, and sends two or more unique data streams or signals in the same frequency, and the receiving node combines the multiple streams or signals to recover the original transmitted streams, as well as single input, single output (SISO) techniques, in which only a single data stream or signal is transmitted. MIMO may be advantageous by sending or transmitting multiple outputs, creating spatial multiplexing to allow for transmission and reception of a better signal. Similarly, MIMO may receive at multiple inputs or antennas, maximizing the possibility of receiving a strong signal. However, MIMO may consume more power than SISO at both the transmitting node by transmitting two or more streams or signals, and at the receiving node by processing the two or more streams or signals; at time, it may be helpful to transition to SISO to conserve power.

The access point 102 may transition from MIMO to SISO to save power under various conditions. For example, the station 102 may transition to an IEEE 802.11 power save mode, and transition from MIMO to SISO concurrently with transitioning to the power save mode. The station 102 may also transition from MIMO to SISO when entering a power save mode using unscheduled automatic power save delivery (U-APSD). The station 102 may also selectively use MIMO for certain types of traffic, such as voice and video traffic, while using SISO for other types of traffic, such as best effort and background traffic. The station 102 may also transition from MIMO to SISO based on remaining battery power, and enter the MIMO communication when battery power is low, or has reached or passed a predetermined threshold. The station 102 may also communicate in MIMO or SISO based on a transmission queue depth; when the transmission queue depth is high, indicating that there are many packets that need to be sent out or transmitted, the station 102 may communicate in MIMO to ensure a high effective data rate, whereas when the transmission depth is low, the station 102 may transition to, or communicate in, SISO, to reduce power consumption.

Figure 2:
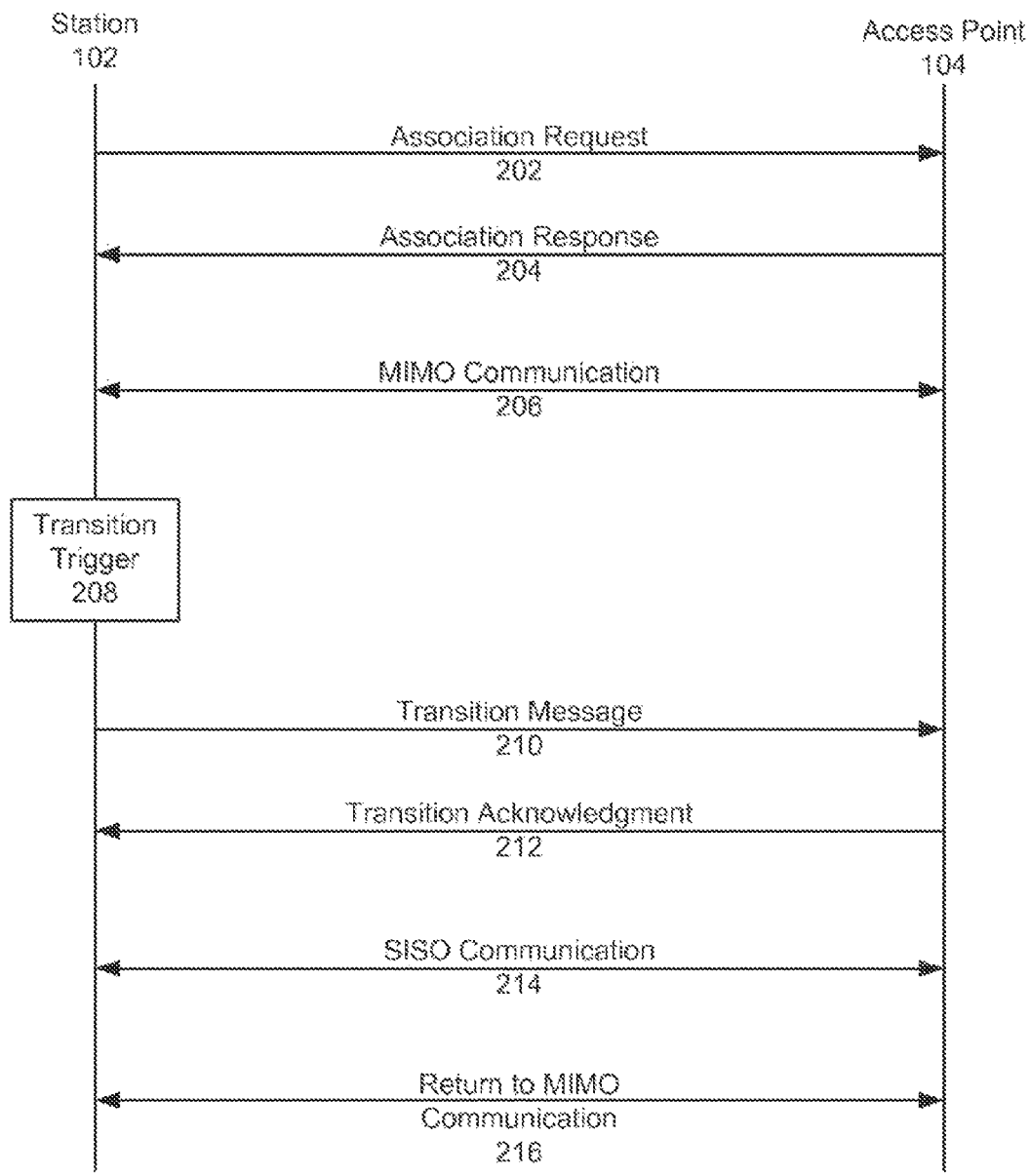
FIG. 2 is a vertical time sequence diagram showing communication between the two nodes according to an example embodiment.

FIG. 2 is a vertical time sequence diagram showing communication between the nodes 102, 104 according to an example embodiment. The diagram shows communication between the station 102 and the access point 104.

Figure 3:
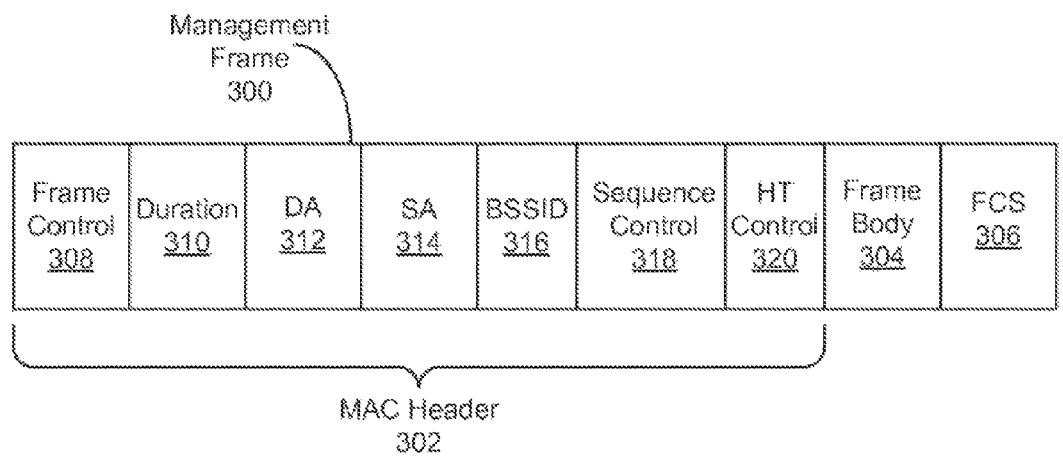
FIG. 3 is a diagram of a management frame according to an example embodiment.

The station 102 and the access point 104 may engage in association procedures. The station 102 and access point 104 may have engaged in probe request and probe response communications to negotiate security parameters, as well as authentication request and authentication response communications to negotiate authentication parameters and/or authenticate the station 102. The station 102 may send an association request 202 to the access point 104. The association request 202 may include a management frame such as the management frame 300 shown in FIG. 3. The association request 202 and/or management frame 300 may include, for example, a medium access control (MAC) header 302, a frame body 304, and a frame check sequence (FCS) 306. The MAC header 302 may include a frame control field 308, a duration field 310, a destination address (DA) field 312, a source address (SA) field 314, a basic service set identification (BSSID) field 316, a sequence control field 318, and a high throughput (HT) control field 320.

The frame body 304 of the association request 202 may include, for example, a capability subfield, a listen interval subfield, a service set identifier (SSID) subfield, a supported rates subfield, an extended supported rates subfield, a power capability subfield, a supported channels subfield, a robust security network (RSN) subfield, a quality of service (QoS) capability subfield, an HT capabilities subfield, a 20/40 basic service set (BSS) subfield, an extended capabilities subfield, and any vendor-specific information elements. In an example embodiment in which the station 102 uses MIMO only for certain types of traffic, such as voice and video traffic (discussed below), the frame body 304 of the association request 202 may also include a subfield and/or element ID indicating which types of traffic will be sent using MIMO and/or which types will be sent using SISO. The subfield and/or element ID indicating which types of traffic will be sent using MIMO may identify only the traffic types which will be sent using MIMO, leaving the SISO traffic types to be inferred by their lack of identification, may identify only the traffic types which will be sent using SISO, leaving the MIMO traffic types to be inferred by their lack of identification, may identify a priority level above or below which traffic will be sent using either MIMO or SISO, or may specifically identify which traffic types will be sent using each of MIMO and SISO, according to various example embodiments.

The association request 202 may indicate a request by the station 102 to associate with a wireless network served by the access point 104. The association request 202 may also indicate the station 102's MIMO and/or SISO communication capabilities (which may, for example, be included in the HT capabilities subfield of the frame body 304).

The access point 104 may respond to the association request 202 by sending an association response 204. The association response 204 may also include a management frame such as the management frame 300 shown in FIG. 3. The association response 204 and/or management frame 300 may include, for example, the medium access control (MAC) header 302, the frame body 304, and the frame check sequence (FCS) 306. The MAC header 302 may include the frame control field 308, the duration field 310, the destination address (DA) field 312, the source address (SA) field 314, the basic service set identification (BSSID) field 316, the wequence control field 318, and the high throughput (HT) control field 320.

The frame body 304 of the association response 204 may include, for example, a capability subfield, a status code subfield, an association identifier (AID) subfield, a supported rates subfield, an extended supported rates subfield, an enhanced distributed channel access (EDCA) parameter set subfield, an HT capabilities subfield, an HT operation subfield, a 20/40 BSS coexistence subfield, an overlapping BSS scan parameters, subfield, an extended capabilities subfield, and any vendor-specific information elements or subfields.

The association response 204 may grant the request by the station 102 to associate with and/or enter the wireless network served by the access point 104. The association response 204 may also indicate that the access point 104 is capable of communicating in both MIMO and SISO modes (which may, for example, be included in the HT capabilities subfield of the frame body 304). The access point 104 may also advertise or indicate whether it is capable of MIMO communication in beacon frames and/or the probe response frame(s).

After the association has been completed by the exchange of the association request 202 and the association response 204, the station 102 and the access point 104 may engage in MIMO communication 206. The station 102 and access point 104 may engage in MIMO communication 206 by sending or transmitting signals, which may include data and/or control information, via multiple outputs or antennas, and/or by receiving signals via multiple inputs or antennas. During the MIMO communication, the access point 104 may indicate its capability of supporting a low power mode and/or unscheduled automatic power save delivery (U-APSD). These capabilities may be indicated, for example, in periodic beacon frames sent or transmitted by the access point 104.

While this MIMO communication is ongoing, the station 102 may experience a transition trigger 208. The transition trigger 208 may include any trigger or determination to enter the SISO mode. The transition trigger 208 may include, for example, a determination to enter a power save mode, a determination that the battery power of the battery in the station 102 is low, or a determination that a transmission queue depth of the station 102 is sufficiently low to enter SISO communication.

Upon the transition trigger, the station 102 may send a transition message 210 to the access point 104. The transition message 210 may indicate that the station 102 will transition from the MIMO communication to the SISO communication. In an example embodiment, the indication of the transition may be included in an action frame which may also indicate that the station 102 is entering a low-power state or U-APSD. The transition message 210 may include an action frame. The transition message 210 may include a NULL or QNULL frame, such as a data frame with a subtype set to Null (no data) or QoS Null (no data).

Figure 4:
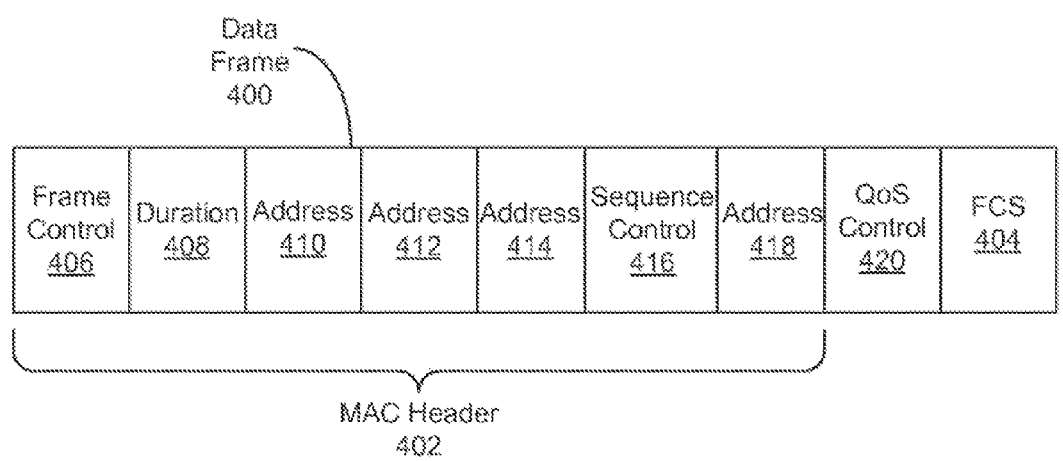
FIG. 4 is a diagram of a data frame according to an example embodiment.

FIG. 4 is a diagram showing a data frame 400 according to an example embodiment. The transition message 210 sent by the station 102 to the access point 104 to indicate the transition from MIMO communication to SISO communication may include the fields shown in the data frame 400 of FIG. 4. The data frame 400 and/or transition message 210 may include a MAC header 402 and a frame check sequence 404. The MAC header 402 may include a frame control field 406, a duration field 408, an address 1 field 410, an address 2 field 412, an address 3 field 414, a sequence control field 416, an address 4 field 418, and a QoS control field 420. The address 1 field 410 may include the address of the intended recipients(s) of the data frame 400 or transition message 210, such as the access point 204, and the address 2 field 412 may include the adress of the station 102 that is transmitting the data frame 400 of transition message 210. The QoS control field 420 may indicate that the data frame 400 and/or transition message 210 is a transition message and that the access point 102 is transitioning from MIMO to SISO, such as by including a subtype value corresponding to Null (no data) or QoS Null (no data), according to example embodiments.

The access point 104 may receive the transition message 210 and send an acknowledgement message, such as a transition acknowledgement 212 to the station 102. The transition acknowledgement 212 may have a similar format to the transition message 210, such as by including the fields of the data frame 400. The QoS control field 420 of the transition acknowledgment 212 may indicate that the data frame 400 and/or transition acknowledgment 412 is a transition acknowledgment, such as by including a subtype value corresponding to CF-Ack (no data), CF-Ack+CF-Poll (no data), QoS CF-Poll (no data), or QoS CF-Ack+CF-Poll (no data), according to example embodiments.

The transition acknowledgment 212 and/or data frame 400 sent by the access point 104 to the station 102 may indicate that the access point 104 has received and accurately processed the transition message 210, and is prepared for the station 102 to transition into SISO and commence communication in SISO. Upon receipt of the transition acknowledgement 212 from the access point 104, the station 102 may engage in SISO communication 214 with the access point 104. In SISO communication 214, the station 102, and/or the access point 104, may communicate by sending data using only a single output or antenna to send messages, and also using only a single input or antenna to receive messages. The station 102 and the access point 104 may engage in SISO communication 214 until the station 102 determines to return to MIMO communication 216. The station 102 may determine to return to MIMO communication 216 based on events which mirror the events which trigger the transition into SISO, such as battery power being high enough or transition queue depth being high enough.

In the example of transitioning to SISO communication 214 based on entering power save mode, the station 102 may engage in SISO communication while in the power save mode. In the power save mode, the station 102 may sleep during most of the time that the access point 104 is communicating with other nodes, but may wake up, such as by powering on the receiver, during expected reception times (which may be indicated by a beacon transmitted by the access point 104), to determine whether data addressed for the station 102 is scheduled to be sent by the access point 104 to the station 102. The access point 104 may buffer packets destined for the station 102 during the station's 102 sleep mode, and may send the buffered packets to the station 102 when the station 102 periodically wakes. If the beacon frame does indicate that data is scheduled to be sent from the access point 104 to the station 102, the station 102 may stay awake and wait for the data or frame, or may wake up at a time indicated by the beacon to receive and process the data or frame. If the beacon does not indicate that the access point 104 will be sending data to the station 102, the station 102 may remain asleep until the next beacon frame or scheduled reception time.

In the SISO communication 214 during U-APSD, the station 102 may spend time in a dozing state which consumes less power. The station 102 may doze until specific times when the access point 104 is scheduled to send frames or packets to the station 102. The station 102 may also request the access point 104 to send buffered frames by sending a trigger frame indicating the request to send the buffered frames; the trigger frame may be included in an action frame, according to an example embodiment. During the times when the access point 104 is scheduled to send frames or packets to the station 102, the station 102 may awake to receive the frames or packets. If the station 102 is entering the SISO communication or transitioning from MIMO communication to SISO communication based on remaining battery power, the station 102 may continuously or periodically monitor the battery power. The station 102 may compare the measured battery power to a threshold; when the battery power is at or below the threshold, the station 102 may determine to transition from MIMO communication to SISO communication. Upon making the determination based on the comparison of the measured battery power to the threshold level, the station 102 may send the transition messsage 210 to the access point 104, and upon receipt of the transition acknowledgement 212 transition from the access point 104, cease or transition from MIMO communication and commence or transition to the SISO communication.

In the example of transitioning based on the transmission queue depth, the station 102 may monitor and/or compare a transmission queue depth to a threshold. The transmission queue depth may be based on a number of packets or frames ready to be sent by the station 102 to the access point 104. The station 102 may buffer frames or packets in a memory, and be ready to send the packets or frames to the access point 104 during times that the access point 104 schedules for the station 102 to send data to the access point 104. When the transmission queue depth has met or gone below the transmission queue depth threshold, the station 102 may determine to transition from MIMO communication to SISO communication. Upon making the determination to transition from MIMO communication to SISO communication, the station 102 may send the transition message 210 to the access point 104. Upon receiving the transition acknowledgement 212 from the access point 104, the station 102 may transition from MIMO communication to SISO communication and commence SISO communication 214 with the access point 104.

In the example in which MIMO mode is used for only certain types of traffic, the station 102 may not need to send the transition message 210 or receive to the access point 104 or receive the transition acknowledgement 212 from the access point 104. In this example, the station 102 and access point 104 may have negotiated the parameters for MIMO and SISO communication during the association. For example, the association request message 202 may have previously indicated for which types of traffic the station 102 will communicate using MIMO and for which the station 102 will communicate using SISO. For example, the association request 202 (which may have the format of the management frame 300) may indicate for which traffic types the station 102 will use MIMO for which traffic types the station 102 will use SISO. The indication of which traffic types will use MIMO and which traffic types will use SISO may be included in a subfield and/or element ID of the frame body 304 of the association request 202. For example, the subfield and/or element ID of the frame body 304 may indicate that the station 102 may communicate with the access point 104 using MIMO for voice traffic and video traffic but will use SISO for best effort traffic and background traffic. Thus, the station 102 and access point 104 may already understand during the MIMO communication and/or SISO communication that the station 102 will be communicating in the indicated type of communication protocol for the indicated type of traffic. The station 102 and access point 104 may not need to engage exclusively in MIMO communication 206 or SISO communication 214, but may engage in blended communication techniques with MIMO communication being used for higher priority traffic types such as voice and video traffic, and SISO communication for lower priority traffic such as best effort and background traffic. In an example embodiment, the station 102 may dynamically change which traffic types use MIMO communication and which traffic types use SISO communication; the station 102 may, for example, send an action frame or management frame to the access point 104 indicating which types of traffic will use MIMO and/or which types of traffic will use SISO.

Figure 5:
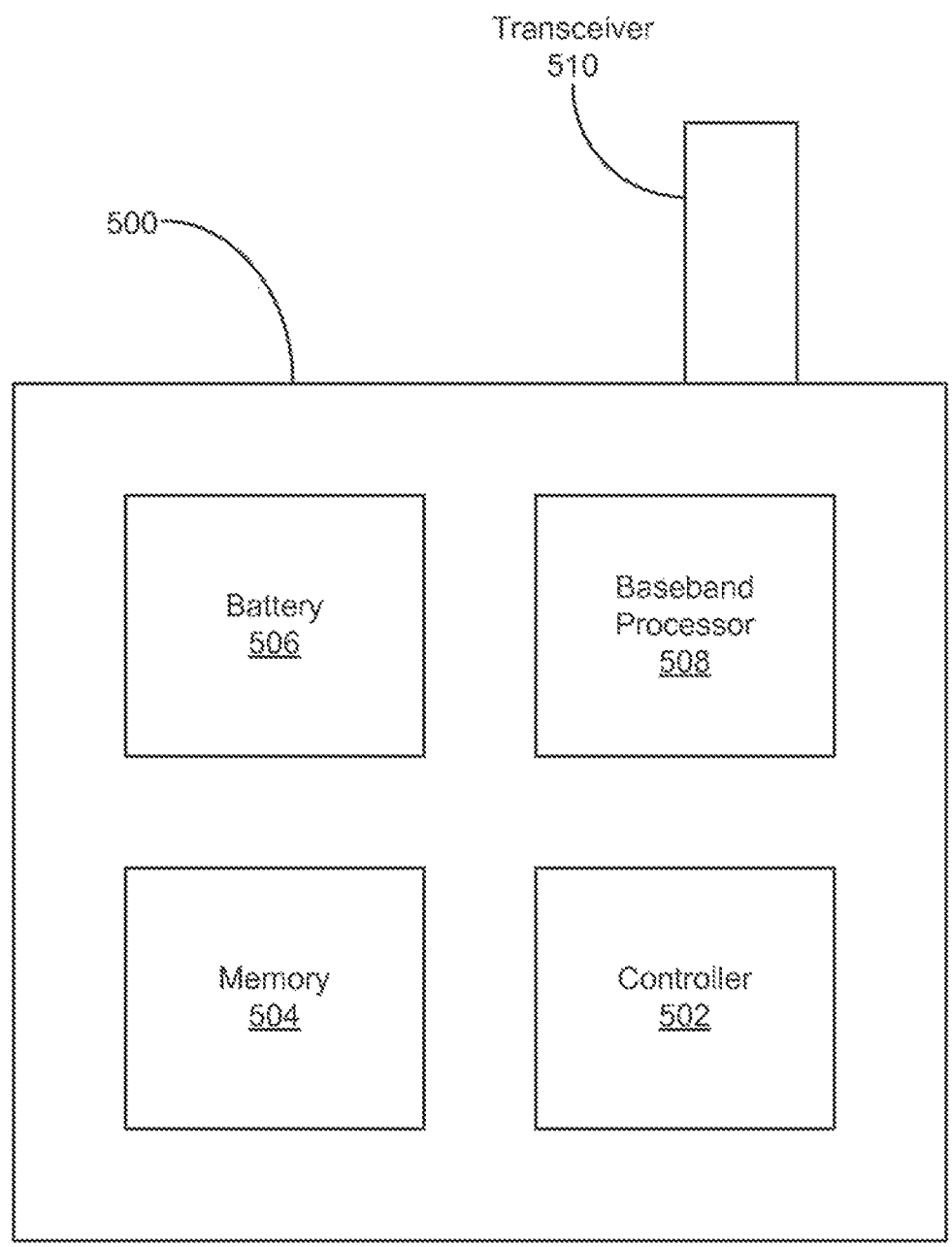
FIG. 5 is a block diagram of an apparatus according to an example embodiment.

FIG. 5 is a block diagram of an apparatus 500 according to an example embodiment. The apparatus 500 may include a wireless node such as the station 102, and may include an IEEE 802.11 node, IEEE 802.16 nodes, IEEE 802.15 node, or cellular telephone/smartphone, netbook, tablet PC, iPad, or laptop computer, as non-limiting examples. The apparatus 500 may include a controller 502 and memory 504. The memory 504 may store data and instructions. The controller 502 may execute the instructions stored in the memory 504 to perform any of the tasks, methods, or functions described herein. The apparatus 500 may also include a rechargeable or non-rechargeable battery 506. The controller 502 may monitor the power level of the battery 506 to determine whether to transition to from the MIMO communication to the SISO communication, as described above.

The apparatus 500 may also include a baseband processor 508. The baseband processor may convert between data generated or processed by the controller 502 and baseband signals received or transmitted by a transceiver 510 according to a communication standard, such as IEEE 802.11, IEEE 802.16, IEEE 802.15, or any cellular communication technology. The apparatus 500 may include the transceiver 500, which may convert between the baseband signals and radio frequency (RF) signals, and serve as the physical interface for communicating with other wireless devices, such as the access point 104.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program to execute the tasks, methods, or functions described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across mulitple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., and FPGA (field programmable gate array) or an ASIC (application-specific integrated circuit).

Processors (or controllers) suitable for the execution of a computer program include, by way of example, both general and special purpose microprocessors, and any one or more processors of any kind of digital computer. Generally, a processor will receive instructions and data from a non-transitory, computer-readable read-only memory or a non-transitory, computer-readable random access memory, or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementation have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A method of transitioning wireless communication modes in a wireless communication with a node, the method comprising:
   determining one or more types of traffic to be transmitted to the node;
   providing, for transmission, an association request to the node, the association request indicating which of the one or more types of traffic to be transmitted to the node in a multiple-input-multiple-output (MIMO) mode and which of the one or more types of traffic to be transmitted to the node in a single-input-single-output (SISO) mode; and
   facilitating a transition between the MIMO mode and the SISO mode based on at least one of the one or more types of traffic determined to be transmitted to the node.

2. The method of claim 1, further comprising:
   generating an indication of the types of traffic determined to be transmitted in the MIMO mode and the types of traffic determined to be transmitted in the SISO mode.

3. The method of claim 2,
   wherein the indication is included in a header portion of the association request, further comprising:
   receiving an association response from the node, the association response including an acknowledgment by the node in response to the association request.

4. The method of claim 3, further comprising:
   determining a change in one or more of the types of traffic determined to be transmitted in the MIMO mode or the SISO mode;
   generating a second indication of the determined change; and providing, for transmission, an action frame to the node subsequent to transmission of the association request, the second indication being included in a header portion of the action frame.

5. The method of claim 1, further comprising:
determining which types of traffic associated with a first priority to be transmitted to the node in the MIMO mode;
determining which types of traffic associated with a second priority to be transmitted to the node in the SISO mode, the first priority being greater than the second priority;
generating an indication of the types of traffic determined to be transmitted in the MIMO mode and the types of traffic determined to be transmitted in the SISO mode; and
providing, for transmission, a management frame to the node, the indication being included in a header portion of the management frame, the transition between the MIMO mode and the SISO mode occurring in response to transmission of traffic associated with the first priority and traffic associated with the second priority.

6. The method of claim 1, further comprising:
determining a stream of traffic to be transmitted to the node, the stream of traffic comprising a first type of traffic to be transmitted in the MIMO mode and a second type of traffic to be transmitted in the SISO mode; and
providing, for transmission, the stream of traffic to the node, the transition between the MIMO mode and the SISO mode occurring dynamically in response to transmission of the first type of traffic and the second type of traffic.

7. The method of claim 1, further comprising:
determining which types of traffic to be transmitted to the node in the MIMO mode;
generating an indication of the types of traffic determined to be transmitted in the MIMO mode; and
providing, for transmission, a management frame to the node, the indication being included in a header portion of the management frame, the transition to the SISO mode being inferred by the node if the indication bypassed identification of which types of traffic to be transmitted to the node in the SISO mode.

8. The method of claim 1, further comprising:
determining which types of traffic to be transmitted to the node in the SISO mode;
generating an indication of the types of traffic determined to be transmitted in the SISO mode; and
providing, for transmission, a management frame to the node, the indication being included in a header portion of the management frame, the transition to the MIMO mode being inferred by the node if the indication bypassed identification of which types of traffic to be transmitted to the node in the MIMO mode.

9. The method of claim 1, further comprising:
determining a priority threshold level for identifying which types of traffic to be transmitted to the node in the MIMO mode, wherein traffic associated with a priority level greater than the priority threshold level is identified as traffic to be transmitted to the node in the MIMO mode;
generating an indication of the priority threshold level; and
providing, for transmission, a management frame to the node, the indication being included in a header portion of the management frame.

10. The method of claim 1, further comprising:
determining a priority threshold level for identifying which types of traffic to be transmitted to the node in the SISO mode, wherein traffic associated with a priority level smaller than the priority threshold level is identified as traffic to be transmitted to the node in the SISO mode;
generating an indication of the priority threshold level; and
providing, for transmission, a management frame to the node, the indication being included in a header portion of the management frame.

11. The method of claim 1, further comprising:
determining a first traffic stream to be transmitted to the node in the MIMO mode;
determining a second traffic stream to be transmitted to the node in the SISO mode; and
generating an indication of the first traffic stream determined to be transmitted in the MIMO mode and the second traffic stream determined to be transmitted in the SISO mode.

12. An apparatus comprising:
a transceiver configured to communicate wirelessly with a node; and
a controller coupled to the transceiver and configured to:
determine which types of traffic to be transmitted to the node in a multiple-input-multiple-output (MIMO) mode;
determine which types of traffic to be transmitted to the node in a single-input-single-output (SISO) mode; and
generate an indication of the types of traffic determined to be transmitted in the MIMO mode and the types of traffic determined to be transmitted in the SISO mode;
provide, for transmission, an association request to the node, the association request indicating which types of traffic to be transmitted to the node in the MIMO mode and which types of traffic to be transmitted to the node in the SISO mode, the indication being included in a header portion of the association request; and
facilitate a transition between the MIMO mode and the SISO mode in response to a type of traffic to be transmitted to the node.

13. The apparatus of claim 12, wherein the controller is configured to:
determine a change in one or more of the types of traffic determined to be transmitted in the MIMO mode or the SISO mode;
generating a second indication of the determined change; and
providing, for transmission, an action frame to the node subsequent to transmission of the association request, the second indication being included in a header portion of the action frame.

14. The apparatus of claim 12, wherein the controller is configured to:
determine which types of traffic associated with a first priority to be transmitted to the node in the MIMO mode; and
determine which types of traffic associated with a second priority to be transmitted to the node in the SISO mode, the first priority being greater than the second priority, the transition between the MIMO mode and the SISO mode occurring in response to transmission of traffic associated with the first priority and transmission of traffic associated with the second priority.

15. The apparatus of claim 12, wherein the controller is configured to:
    determine a stream of traffic to be transmitted to the node, the stream of traffic comprising a first type of traffic to be transmitted in the MIMO mode and a second type of traffic to be transmitted in the SISO mode; and
    provide for transmission the stream of traffic to the node, the transition between the MIMO mode and the SISO mode occurring dynamically in response to transmission of the first type of traffic and the second type of traffic.

16. The apparatus of claim 12, wherein the controller is configured to:
    determine which types of traffic to be transmitted to the node in the MIMO mode or the SISO mode; and
    provide an indication of the types of traffic determined to be transmitted in one of the MIMO mode or the SISO mode in the header portion of the association request, the transition to the MIMO mode being inferred by the node if the indication bypassed identification of which types of traffic to be transmitted to the node in the MIMO mode, and the transition to the SISO mode being inferred by the node if the indication bypassed identification of which types of traffic to be transmitted to the node in the SISO mode.

17. The apparatus of claim 12, wherein the controller is configured to:
    determine a priority threshold level for identifying which types of traffic to be transmitted to the node in one of the MIMO mode or the SISO mode, wherein traffic associated with a priority level greater than the priority threshold level is identified as traffic to be transmitted to the node in the MIMO mode, and wherein traffic associated with a priority level smaller than the priority threshold level is identified as traffic to be transmitted to the node in the SISO mode; and
    provide an indication of the priority threshold level in the header portion of the association request.

18. A computer program product comprising instructions stored in a non-transitory computer-readable storage medium, the instructions comprising:
    instructions for providing, for transmission, an association request to a node in association with a client device, the association request including an indication of a first type of traffic to be transmitted in a multiple-input-multiple-output (MIMO) mode and a second type of traffic to be transmitted in a single-input-single-output (SISO) mode;
    instructions for facilitating a transition from the MIMO mode to the SISO mode for transmitting the second type of traffic if the client device is previously set to the MIMO mode; and
    instructions for facilitating a transition from the SISO mode to the MIMO mode for transmitting the first type of traffic if the client device is previously set to the SISO mode.

19. The computer program product of claim 18, the instructions comprising:
    instructions for determining the first type of traffic to be transmitted to the node in the MIMO mode;
    instructions for determining the second type of traffic to be transmitted to the node in the SISO mode; and
    instructions for generating the association request for transmission to the node, the indication being included in a header portion of the association request.

20. The computer program product of claim 18, the instructions comprising:
    instructions for determining that the first type of traffic is associated with a first priority to be transmitted to the node in the MIMO mode; and
    instructions for determining that the second type of traffic is associated with a second priority to be transmitted to the node in the SISO mode, the first priority being greater than the second priority, the transition between the MIMO mode and the SISO mode occurring in response to transmission of the first type of traffic associated with the first priority or transmission of the second type of traffic associated with the second priority.

* * * * *